Figure 1:
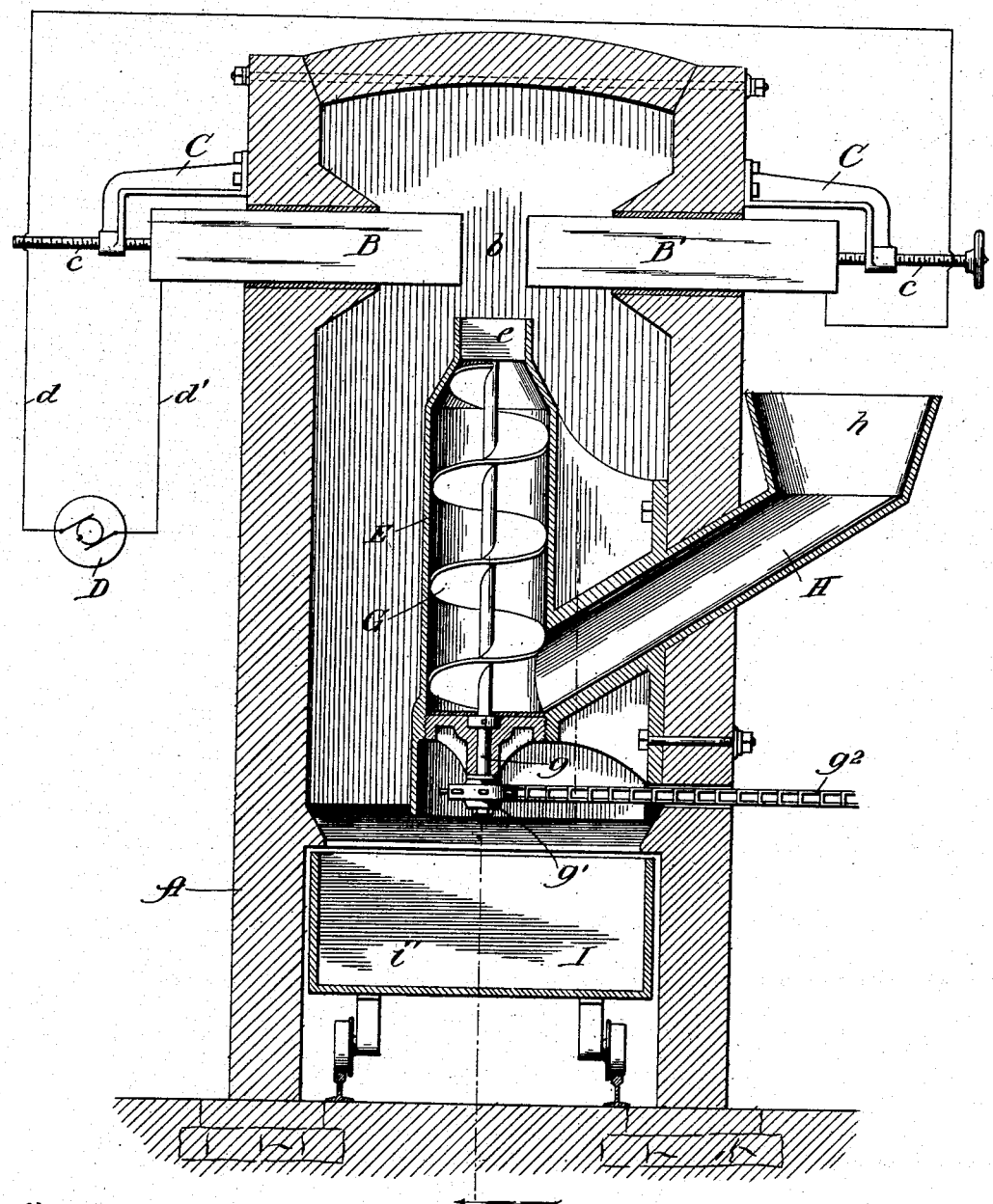

No. 675,646. Patented June 4, 1901.
J. ZIMMERMAN & I. S. PRENNER.
PROCESS OF PRODUCING CALCIUM CARBID.
(Application filed Aug. 21, 1899.)

(No Model.) 2 Sheets—Sheet 1.

Witnesses:
Inventors:
John Zimmerman &
Isedore S. Prenner,

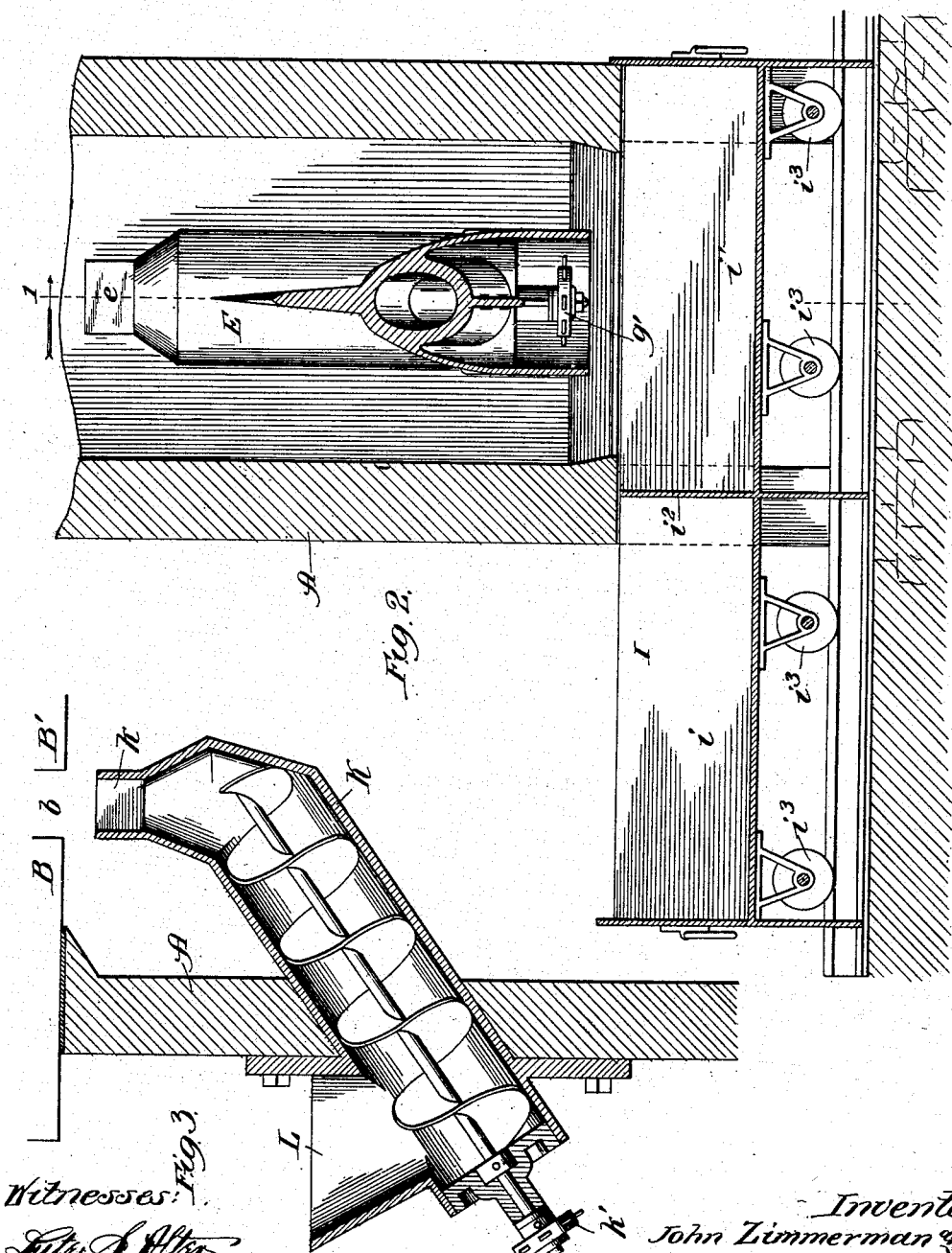

UNITED STATES PATENT OFFICE.

JOHN ZIMMERMAN AND ISEDORE S. PRENNER, OF CHICAGO, ILLINOIS.

PROCESS OF PRODUCING CALCIUM CARBID.

SPECIFICATION forming part of Letters Patent No. 675,646, dated June 4, 1901.

Original application filed March 13, 1899, Serial No. 708,929. Divided and this application filed August 21, 1899. Serial No. 727,964. (No specimens.)

*To all whom it may concern:*

Be it known that we, JOHN ZIMMERMAN and ISEDORE S. PRENNER, citizens of the United States, residing at Chicago, in the county of Cook and State of Illinois, have invented a new and useful Process of Producing Calcium Carbid, (the same being a division of the invention for which we filed an application for Letters Patent of the United States March 13, 1899, Serial No. 708,929,) of which the following is a specification.

Our invention relates to processes and methods for calcining materials for the production of amalgamates or conglomerates, and is especially adapted for use with that class of apparatus in which a mixture of lime, carbon, and a suitable binder may be introduced and subjected to the heat of an electric "arc" for the purpose of smelting the same and forming the product or material known as "calcium carbid."

The principal object of our invention is to attain in a simple and reliable manner an economical, rapid, and efficient reduction of the materials to be calcined under conditions and surroundings that are best adapted for perfect and complete fusion of the materials, so as to have a firm adhesion thereof in the final product.

A further object is to insure the best and most perfect results in the process of producing calcium carbid and to effect a great saving in heat with an increase of the fused product.

A further object is to feed the raw material so as to have it subjected to the heat of the furnace in its advance and also to the heat of the molten material as it flows downward over the raw material being advanced; and other objects and purposes will appear from an examination of the drawings and from the following description.

The apparatus for carrying out the invention as to the process and methods thereof and the various steps involved is shown in the accompanying drawings, in which—

Figure 1 is a vertical sectional elevation of a furnace constructed and adapted for use in our invention; Fig. 2, a vertical sectional elevation of a portion of the furnace, taken on line 2 of Fig. 1; and Fig. 3, a sectional detail view of a modification hereinafter described.

In the production of calcium carbid by the electrosmelting process as heretofore practiced it is well known that there are various objections and disadvantages attending the same, one of which is a waste of heat, due to the fact that in the old way the process has to be carried on intermittently, thereby preventing the entire heat of the arc from being utilized. Furthermore, with the old type of furnace and process the interior of the furnace had to be accessible, with the result that considerable waste was entailed by such construction from the consequent imperfect fusion of the materials arising from the loss of heat and radiant energy in opening up the furnace.

The principal object of our invention, therefore, is to provide a simple, economical, and efficient process for the production of calcium carbid and in and by which the lime, carbon, and binder will be completely and effectually reduced to a molten condition and fused together.

A feature of our invention is in the provision for feeding the mixture from below, so that as the mixture is fed to the arc it completely fills the space and utilizes the entire heat of the arc. A further feature is the provision for feeding the raw material from below upward wholly within the interior of the furnace-chamber and beneath and in line with the electric arc.

Another feature is in having the material as it is fed forward or advanced in a confined state subjected to the heat of the furnace and also to the heat of the molten material.

These features, together with others, will more fully hereinafter appear in the description of the apparatus and process.

In constructing an apparatus in accordance with and to carry out our improvements and invention we provide a furnace, as shown in Figs. 1 and 2, having inclosing walls A of any desired kind of refractory material, such as fire-brick. Introduced through openings in the side walls of the furnace, and preferably near the upper portion thereof, are two electrodes B and B′, arranged so as to form an arc $b$, into which a mixture of lime and carbon, with a suitable binder, may be fed. It is highly desirable to have means for adjusting the electrodes to obtain the correct arc as well as to compensate for the consumption of the electrodes. In order to accomplish this result, we provide brackets C, which are secured to the furnace-walls and provided with adjusting-screws $c$, adapted to contact the electrodes and push the same in whenever desirable or necessary. To furnish current for the arc, we prefer to provide a dynamo D of the alternating type and connect its poles with each electrode by means of the wire cables $d$ and $d'$. It will be noticed from an inspection of the drawings that the arc formed by these electrodes is practically a rectangular arc, and in order to fill it completely and prevent the waste radiant energy or calorific rays it is desirable to feed the mixture of lime and carbon into the arc in a rectangular form and of substantially the same size as the arc. This cannot be done by feeding it in loose form, for if granulated it would flow away before reaching the arc. It is therefore desirable that the mixture of lime and carbon, with a suitable binder—such as borax, graphite and iron, or molasses—should be formed in a pasty condition by proportionate quantities of the ingredients and compressed automatically, so that it may be fed to the arc and fall away as soon as smelted. In order to accomplish this result, we provide what we term a "feeding-chamber" E, which is preferably arranged underneath and in line with the arc. The discharge $e$ of this feeding-chamber is smaller in diameter than the main portion and is also rectangular in cross-section and about the same as the desired arc, so that as the feeding and compressing screw G is rotated in the direction of the hands of a watch the material is fed forwardly and compressed as it passes through the discharge-opening. It will be noticed from an inspection of Fig. 1 that the discharge-opening of this feeding-chamber is arranged a slight distance away from the arc, which distance should be sufficient to bring the opening outside of the smelting-point and so that the compressed stack or column of mixed lime, carbon, and binder may enter the arc and be smelted by the time it has reached the upper portion thereof, when it falls away and allows the following material to be acted on, all in a continuous manner. The rotating feed-compressing screw is operated by means of a shaft $g$, a sprocket-wheel $g'$, and a sprocket-chain $g^2$, connected with any prime mover, such as a driving-shaft, an engine, a motor, or other mechanism.

To supply the mixture of lime, carbon, and binder to the compressing-chamber, we provide its lower portion with an inclined chute H, having a hopper $h$ at the upper portion thereof, into which the mixture may be shoveled. This hopper, it will be understood, can be of any size to hold any desired amount of material, so that the process can be carried on continuously, or until the material is consumed.

It is desirable that the resultant product of calcium carbid may be withdrawn from the furnace without in any way interfering with the operation thereof. In order to accomplish this result, we provide the lower part of the furnace with a movable receptacle I, having two chambers $i$ and $i'$, separated by means of the partition $i^2$. When the machine is in operation, the chamber I is the first one arranged under the arc so that the molten mixture may flow down and be caught therein. As soon as this chamber is filled the receptacle is pulled over on its wheels $i^3$, so that the second chamber $i'$ is brought under the arc, and while this chamber is being filled the first chamber is being emptied without in any way interfering with the process of reduction or permitting the cold external air to enter the furnace.

In Fig. 3 we have shown an apparatus for carrying out the process of our invention, in which a feeding-chamber K is arranged at an incline to the arc, with its compressing discharge-opening $k$ vertically under the arc and its receiving end outside of the wall of the furnace, for attachment of the driving sprocket-wheel $k'$ of the feeding and compressing screw, so as to be operated from outside of the furnace. The apparatus has a hopper L, attached directly to the outer end of the compressing-chamber, for feeding the raw material into the feeding and compressing chamber, to be carried upward therein and have a direct feed in line with the arc from beneath the arc, as required for the process of the invention.

An important and essential feature which enters into the construction and operation of our process is found in the compressing and feeding of the raw material to and between the electrodes from below and in line with the arc of the electrodes, and this feature or step in our process and invention is had by and through the location of the feeding duct or chamber and the contracted neck thereof and the feeding device therefor which operates within such duct or chamber, so that the raw material will be forced upward in a direct line with the electric arc. The raw material is compressed as it is forced through the neck and formed into the shape of a continuous cake or core, which at its projected end comes between and is subjected to the arc of the electrodes and is thereby smelted for the molten material to flow back over the end of the cake or core and down and over the side of the feeding duct or chamber, constituting a material step or feature in the carrying out of our process and invention.

The feed duct or chamber is located laterally within the body of the furnace, subject to the heat of the arc, so that such duct or chamber becomes heated from the heat of the furnace and arc and transmits heat to the raw material, and this transmitted heat is in addition to the heat from the molten material which flows over the chamber and adds its heat to the raw material, thereby subjecting the raw material to the combined heat of the furnace and of the molten material in the process of reduction of the raw material and the production of the calcium carbid.

The plastic raw material as it is forced from the chamber gathers heat from the furnace and from the molten material and by the progressive advance toward the electric arc under the heat to which it is subjected, which heat increases as the arc is approached, is brought to a high degree of heat, by which a perfect, thorough, and complete combination of the component parts of the carbid is insured at a great saving and economy of heat.

The body of the cake or core as it is being compressed and formed in the neck and the raw material within the chamber are prevented from any intermixture with the molten material by such material flowing down and over the neck and forming a seal at the neck against any entrance of the material into the duct or chamber, and at the same time such sealing does not interfere in the least with the advance of the cake or core through the neck, as the material being in a molten state will not adhere to the neck around the cake or core sufficiently firm so as not to be broken by the advance of the cake or core.

We claim—

1. The process herein described of producing calcium carbid, which consists of pressing upwardly in a confined state within the chamber of an electric furnace beneath the electrodes a continuous mass of raw material, mixing and compacting the mass in its upward passage while subjected to heat within said chamber, compressing the mass at its point of ejection from the confined state, thereby forming a continuous cake or core of raw material beneath the electrodes, continuing the upward pressure on the raw material, and feeding the thus-formed cake or core in a direct line between the electrodes, substantially as described.

2. The process herein described of producing calcium carbid, which consists in pressing upwardly in a confined state within a closed chamber of an electric furnace beneath the electrodes a continuous mass of raw material, mixing and compacting the mass in its upward passage, upwardly discharging the material from a confined state beneath and in direct line with an electric arc, subjecting the material in its upward passage uninterruptedly to the interior heat of such chamber, contracting the material and forming a cake or core at the point of discharge from its confined state, melting the thus-formed cake or core between the electrodes and causing the molten material to flow down the cake or core around the raw material in its confined state, thereby subjecting the material and the formed cake or core to the heat of the molten material, substantially as described.

JOHN ZIMMERMAN.
ISEDORE S. PRENNER.

Witnesses:
THOMAS A. BANNING,
THOMAS B. MCGREGOR.